(No Model.)
R. T. F. DODDS.
BRAKE FOR RAILWAY CARS.
No. 543,522. Patented July 30, 1895.
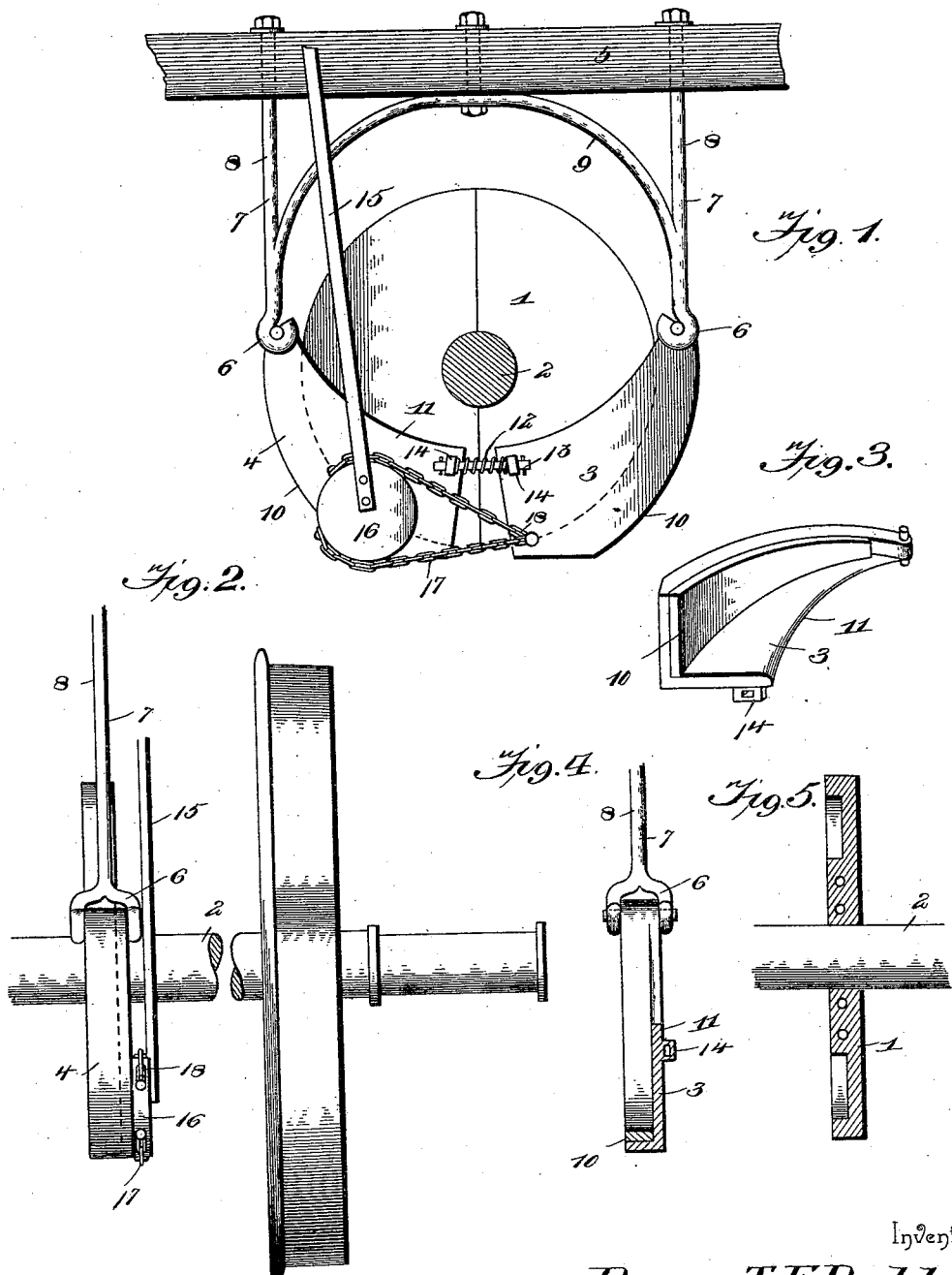
Witnesses
John C. Shaw.
H. F. Riley
Inventor
Rowan T. F. Dodds,
By his Attorneys,
C. A. Snow & Co.

UNITED STATES PATENT OFFICE.

ROWAN T. F. DODDS, OF LOUISVILLE, OHIO.

BRAKE FOR RAILWAY-CARS.

SPECIFICATION forming part of Letters Patent No. 543,522, dated July 30, 1895.

Application filed September 10, 1894. Serial No. 522,643. (No model.)

*To all whom it may concern:*

Be it known that I, ROWAN T. F. DODDS, a citizen of the United States, residing at Louisville, in the county of Stark and State of Ohio, have invented a new and useful Car-Brake, of which the following is a specification.

The invention relates to improvements in car-brakes.

The objects of the present invention are to improve the construction of car-brakes, to dispense with the ordinary construction of brake bars, shoes, and levers, and to provide a simple and effective device adapted to be readily applied to cars and capable of operation from either end thereof.

The invention consists in the construction and novel combination and arrangement of parts hereinafter fully described, illustrated in the accompanying drawings, and pointed out in the claims hereto appended.

In the drawings, Figure 1 is a side elevation of a brake constructed in accordance with this invention. Fig. 2 is an end elevation of the same. Fig. 3 is a detail perspective view of a portion of one of the shoes. Fig. 4 is a detail sectional view illustrating the manner of suspending the shoes. Fig. 5 is a detail sectional view of the friction wheel or disk upon which the brake-shoes operate.

Like numerals of reference indicate like parts in all the figures of the drawings.

1 designates a friction wheel or disk, preferably constructed of two sections and bolted to a car-axle 2 and adapted to be frictionally engaged by a pair of brake-shoes 3 and 4 loosely suspended from a cross-beam 5 of a truck-frame or the car-body. The shoes are segmental and have their upper ends journaled or pivoted between a forked portion 6 of a hanger 7, which is composed of vertical sides 8, located at opposite sides of, or, rather, in front and in rear of the friction wheel or disk, and an upwardly-curved bracing portion 9 connecting the sides and centrally bolted to the cross-beam 5. Each shoe is composed of a curved portion 10 to engage the edge of the friction wheel or disk and a flange 11 arranged at the side of the same. The shoes are located at the bottom of the friction wheel or disk, and their adjacent ends are held slightly separated by a spring 12 disposed on a bolt or pin 13, which is loosely arranged in openings of lugs 14. By this construction the brake-shoes are normally held off of the friction wheel or disk.

The brake is applied by means of a lever 15 provided with a circular head 16 composed of a wheel or disk, and the latter is connected by upper and lower chains 17 and 18 with the shoe 3, it being fulcrumed on the other shoe 4. By swinging the lever in either direction one or the other of the chains is wound around the circular head or wheel, thereby drawing the shoes together and forcing them into contact with the friction-wheel. One of the chains is arranged on the upper edge of the disk and the other on the lower, and this arrangement enables the brake to be applied from either end of a car, and the said lever 15 is adapted to be connected with ordinary brake-shafts and is designed to be operated similar to the ordinary brakes.

A brake attachment is designed to be applied to each axle, and it will be apparent that a simple and effective brake is provided and that the ordinary construction of brake-shoes, brake-beams, and levers is dispensed with. It will also be seen that the lever 15 can be readily connected with the ordinary air-brake mechanism.

Changes in the form, proportion, and the minor details of construction may be resorted to without departing from the principle or sacrificing any of the advantages of this invention.

What I claim is—

1. In a brake, the combination of a friction wheel designed to be mounted on an axle, the opposite brake-shoes arranged in advance and in rear of the wheel and adapted to engage the same, a lever fulcrumed on one of the shoes and provided with a circular head, and a chain connected with the other shoe and arranged to be wound on the head of the lever, whereby the brake-shoes are forced into contact with the wheel, substantially as described.

2. In a brake, the combination of a friction wheel designed to be fixed to an axle, the opposite segmental shoes arranged to engage the wheel, a lever fulcrumed on one of the shoes and provided with a circular head, and upper and lower chains connected with the other shoe and arranged on the upper and lower sides of the head of the lever, whereby the brake-shoes will be applied when the lever is swung in either direction, substantially as described.

3. In a brake, the combination of a friction wheel designed to be fixed to a car-axle, a depending hanger having an arched portion located over the wheel, and vertical sides connected with the terminals of the arched portion, segmental brake-shoes pivotally connected with the sides of the hanger and arranged at the bottom of the wheel, a spring for holding the brake-shoes normally off the wheel and connected with their adjacent ends, a lever fulcrumed on one of the brake-shoes and provided with a circular head, and the upper and lower chains arranged on opposite edges of the circular head and connected with the other brake-shoe, substantially as and for the purpose described.

4. In a brake, the combination of a friction wheel designed to be fixed to an axle, a hanger, the segmental brake shoes pivoted at their upper ends to the hanger and depending therefrom and provided at one side of the friction wheel with flanges, a spring connection between the lower ends of the shoes, and mechanism mounted on the free ends of the shoes and located below the spring connection and adapted to force the shoes into contact with the friction wheel, substantially as described.

In testimony that I claim the foregoing as my own I have hereto affixed my signature in the presence of two witnesses.

ROWAN T. F. DODDS.

Witnesses:
JOHN S. MYERS,
GEORGE E. VIOLAND.